HAROLD A. GREENWALD,
INVENTOR.

BY Theodore E. Bieber

United States Patent Office 2,973,136
Patented Feb. 28, 1961

2,973,136
COMPRESSOR

Harold A. Greenwald, Los Angeles, Calif., assignor to The Garrett Corporation, Los Angeles, Calif., a corporation of California Filed June 13, 1957, Ser. No. 665,523

4 Claims. (Cl. 230—116)

This invention pertains to compressors, and more particularly to a means for cooling the bearings and sealing the shaft opening of a turbine-driven centrifugal refrigeration compressor.

In centrifugal vapor cycle refrigeration compressors which are designed to handle such refrigerants as dichlorodifluoromethane, known commercially as Freon 12, some means must be provided for cooling the bearings and sealing the shaft in the compressor housing. This problem is aggravated by the fact that Freon 12 may have a suction pressure of the order of 45 pounds per square inch absolute in a typical installation. This high suction pressure results in a large pressure differential across the shaft seal of a centrifugal type of compressor where suction pressure exists on one side of the seal and normal sea level atmospheric or lower pressure on the other side.

This invention would solve the problem of a relatively large pressure differential across the shaft seal while, at the same time, cooling the bearings. Means are provided for circulating a cooling fluid around the bearings and then using it to increase the pressure on one side of the shaft seal to within a few pounds per square inch of the suction pressure of the compressor.

This invention is particularly adaptable to turbine driven single inlet centrifugal compressors where the turbine wheel is mounted on one end of a shaft and the compressor impeller is mounted on the opposite end of the shaft. In this type of compressor, a labyrinth type seal or other seal which permits some leakage can be provided on the shaft for the turbine end of the unit, and an additional shaft seal for the compressor end of the unit, thus isolating the portion of the housing between the two shaft seals. The pressure existing in the housing between the two shaft seals can then be increased until it is only slightly lower than the normal suction pressure of the compressor, thus substantially lowering the pressure differential across the compressor shaft seal. The lowering of the pressure differential across the compressor shaft seal reduces the amount of refrigerant which is lost due to leakage of the refrigerant past the shaft seal at the compressor end of the unit.

This invention also provides a means for cooling the bearings used to support the shaft where the turbine operates on compressed air or other gases which may be used for cooling the bearings without harmful effects. In these cases, the fluid can be bled from the turbine inlet, cooled, and allowed to flow through suitable passageways which surround the bearings. The fluid is then vented from the compressor housing through a restricted passageway so that the pressure existing in the compressor housing will attain substantially the same pressure as the bleed pressure of the fluid. The fluid used for cooling the bearings is allowed to leak from the housing past the turbine shaft seal into the portion of the housing between the shaft seals, thus increasing the pressure in this portion of the housing to substantially the same pressure as the bleed pressure of the fluid.

Accordingly, the principal object of this invention is to provide a compressor unit with novel means for cooling the compressor bearings and reducing the pressure differential across the compressor shaft seal.

Another object of this invention is to provide a turbine-driven refrigeration compressor with unique means both to cool the bearings and to increase the pressure in the bearing carrier utilizing fluid bleed from the turbine.

Another object of this invention is to provide a unique means for pressurizing the bearing carrier of a compressor utilizing the same fluid which is used to cool the bearings.

Further objects and advantages of this invention will be more apparent to those skilled in the art to which it pertains from the following detailed description when taken in conjunction with the accompanying drawing, in which.

Figure 1:
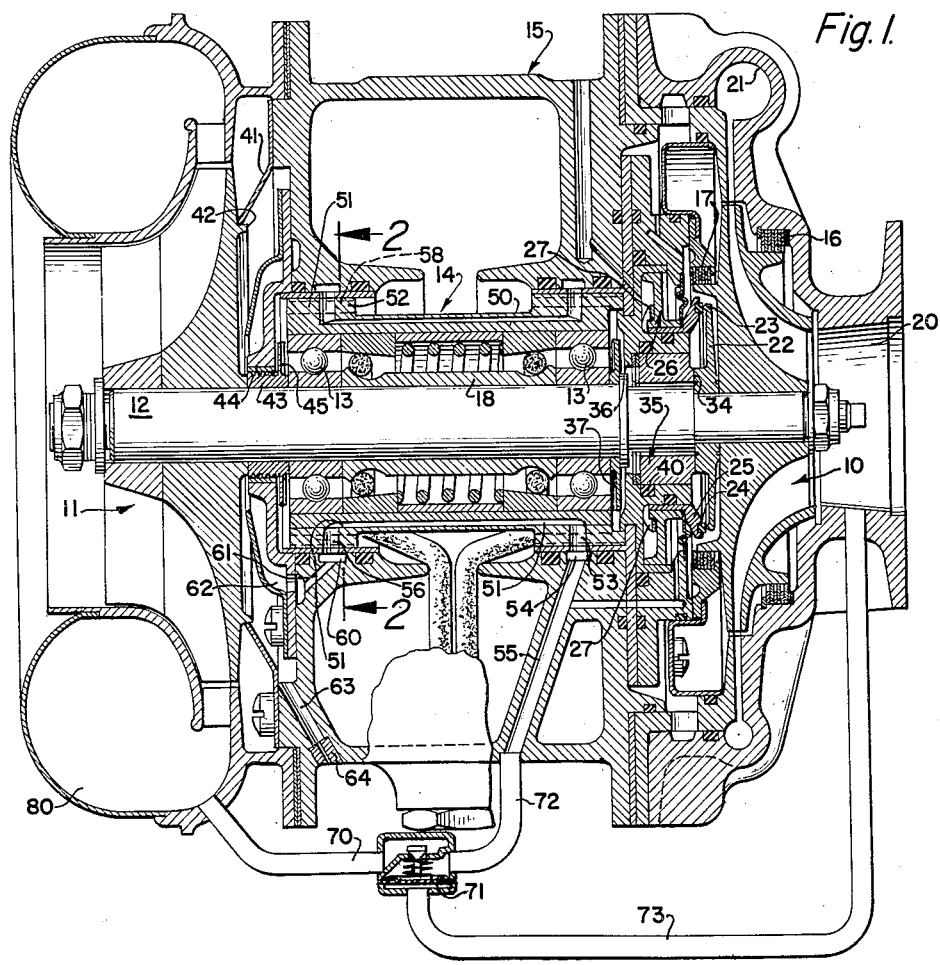
Fig. 1 is a cross-section of a turbine-driven refrigeration compressor constructed according to this invention.

Referring to Fig. 1, there is shown a turbine-driven centrifugal compressor having a compressor impeller 10 mounted on one end of a shaft 12 and a turbine wheel 11 mounted on the opposite end of the shaft. The compressor impeller and turbine wheel in combination with shaft 12 form the rotating portion of the unit which is rotatably supported in a bearing carrier 14 by means of two ball bearings 13. The two bearings 13 are axially spaced on the shaft 12 by means of a tubular spacing member 18. The bearing carrier 14, in turn, is supported by the composite housing 15 of the turbine-compressor unit. The right-hand end of the composite housing 15 is provided with a suction inlet opening 20 which is aligned with the inlet eye of the compressor impeller 10. The discharge of the compressor impeller is collected in a scroll-shaped chamber 21 which is formed in the composite housing 15 and conducted to a suitable discharge opening (not shown). The compressor impeller 10 is provided with suitable labyrinth seals 16 and 17 on its front and back sides, respectively, to isolate the compressor discharge from both the suction inlet of the compressor and the back side of the impeller. The portion of the back side of the compressor impeller located inwardly from the labyrinth seal 17 is vented to the suction inlet opening 20 of the compressor by means of a passageway (not shown) formed in the composite housing 15. It is necessary to vent this area to the suction side in order to maintain the lowest possible refrigerant pressure on the compressor side of the compressor shaft seal.

In order to prevent leakage of refrigerant from the system or air into the system at low ambient temperatures when the turbine-compressor unit is shut down, a sealing means is provided which isolates the compressor end from the remainder of the unit. This sealing means consists of a seal rotor 22 which is mounted on the shaft adjacent the back side of the compressor impeller 10. The outer periphery of the seal rotor 22 is provided with an axially projecting seat 23 which engages a resilient sealing ring 24 mounted on one side of an annular piston 25. The annular piston 25 is disposed to reciprocate in an annular cylinder 26 formed in the composite housing 15 and is urged into sealing engagement with the seat 23 by means of a wave spring 27. The sealing ring 24 is disengaged from the seat 23 on the seal rotor when the unit is started by admitting pressurized fluid to the right-hand side of the cylinder 26 to move the piston 25 to the left. This sealing means is more completely described and claimed in a co-pending application entitled, "Seal for Refrigerant Compressor," by Harold A. Greenwald, filed December 21, 1956, Serial No. 629,884.

Figure 3:
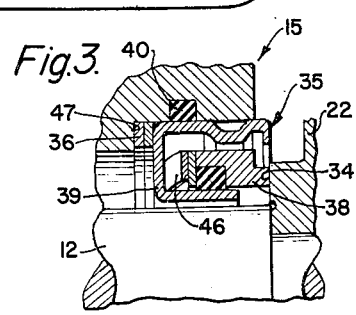
Fig. 3 is a partial view drawn to an enlarged scale and showing the details of the compressor shaft seal.

The shaft seal 35 on the compressor end of the unit, as shown in Fig. 3, consists of a flat radial surface 34 formed on the seal rotor 22 which rotates in a sealing engagement with a similar surface formed on a sealing ring 38. The sealing ring 38 is mounted in an annular retainer 39 having a U-shaped cross-section. A wave spring 46 which is mounted in the left side of the retainer 39 urges the sealing ring 38 to the right to engage the surface 34. The shaft seal 35 is mounted in a cylindrical opening formed in the composite housing 15 and abuts against an inwardly projecting shoulder 47. Shim members 36 are placed between the end of the annular retainer 39 and the shoulder 47 to properly position the shaft seal 35 axially with respect to the seal rotor 22. The outer surface of the retainer 39 is sealed by means of an O-ring 40 which fits in a co-operating groove formed in the composite housing while the inner surface of the retainer is radially spaced from the shaft 12. The sealing ring 38 should be formed of a material which will allow the seal rotor 22 to rotate in a sealing relationship with it, such as carbon or similar self-lubrication materials.

The turbine wheel 11 is provided with a rotating seal adjacent its outer periphery consisting of a ring-shaped deflector 41, the inner diameter of which is slightly spaced from an axially projecting flange 42 formed on the back side of the turbine wheel 11. The turbine is also provided with a labyrinth shaft seal consisting of a ring member 43 mounted on the shaft 12 and a ring 44 mounted in the composite housing 15. The outer surface of the ring member 43 is provided with a plurality of axially spaced grooves which form the individual restrictions of the labyrinth seal. The ring member 43 is also provided with an outwardly projecting radial flange 45 at its right-hand end which acts as an oil slinger to transfer the oil used for lubrication of the bearing 13 back through suitable passageways 58 to the oil sump which is formed in the center portion of the composite housing 15. A similar oil slinger 37 is mounted adjacent the other bearing 13.

Figure 2:
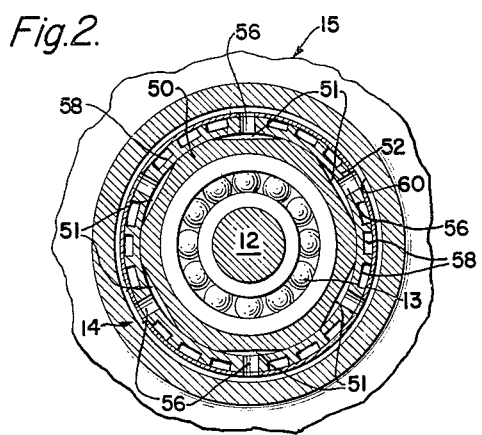
Fig. 2 is a partial cross-section taken along line 2—2 of Fig. 1, and showing the construction of the bearing carrier and the coolant passageways which surround the bearings.

The bearing carrier 14 consists of a tubular inner member 50 which is surrounded on its outer surface by a second tubular member 52. The tubular member 50 is provided with six circumferentially spaced coolant passageways 51 formed on its outer surface, as shown in Fig. 2. Each of the coolant passageways 51 is formed by machining a flat surface on the outer surface of the tubular member 50 and enclosing the surface with the second tubular member 52 to form a passageway. The right-hand end of each of the coolant passageways 51 is connected by means of a passageway 53 formed in the outer tubular member 52 to an annularly shaped chamber 54 formed in the composite housing 15. The left-hand end of each of the coolant passageways is connected by means of a passageway 56 also formed in the tubular member 52 to an annular chamber 60 formed in the composite housing 15. The annular chamber 54 is connected to a source of pressurized fluid by means of a passageway 55 formed in the composite housing 15. The annular chamber 60 is connected to the space 62 surrounding the turbine shaft seal by means of a passageway 61, also formed in the composite housing 15. A portion of the bearing cooling fluid flows from the space 62 past the labyrinth shaft seal into the interior of the bearing carrier 14 between the labyrinth shaft seal 44 and the turbine shaft seal 43. The interior of the bearing carrier is not vented to any lower pressure area and, thus, the fluid leaking past the labyrinth shaft seal will increase the pressure until it is substantially equal to the pressure existing in the space 62 which surrounds the labyrinth shaft seal.

The fluid in the space 62 is vented through a flow control orifice plug 64 which is mounted in a vent passageway 63 formed in the housing 15. The vent passageway 63 and plug 64 vents the bearing cooling fluid from the space 62 to the atmosphere surrounding the compressor unit. The bearing cooling fluid in flowing out the vent passageway 63 will flow in close proximity to the back side of the turbine wheel 11, thus cooling the turbine wheel.

The bearing cooling fluid may be supplied from any source of pressurized cooling fluid, such as compressed air or the like, but in the drawing is shown as being supplied by a bleed conduit 70 which communicates with the inlet scroll 80 of the turbine. The turbine shown in this invention is a pneumatic turbine which is adapted to run on compressed air bled from the main or auxiliary engines of an airplane or similar vehicle. In some cases it may be necessary to cool the air which is bled from the turbine 11 before it can be used for cooling the bearings. In these cases a small heat exchanger (not shown) may be installed in the duct 70. The duct 70 communicates with a pressure control means 71, the outlet of which is connected by means of a conduit 72 to the inlet end of the passageway 55. The pressure control means 71 is also connected to the suction inlet 20 of the compressor by means of a tube 73. The pressure control means 71 may be any suitable pressure regulating device which will maintain the pressure in the conduit 72 a predetermined amount below the suction pressure of the compressor while maintaining isolation of the air and refrigerant. A simple spring loaded diaphragm type regulating valve is shown although other regulating valves may be used providing the refrigerant and cooling air are isolated.

When the turbine-compressor of this invention is operated by admitting air to the inlet scroll 80 of the pneumatic turbine, a portion of the compressed air will also flow through the conduits 70, 72 and the passageway 55. The compressed air will flow from the passageway 55 to the annular chamber 54 and then to the right-hand end of the bearing cooling passageways 51. The compressed air flowing through the bearing cooling passageways 51 will cool the bearings and then flow into the space 62 surrounding the labyrinth shaft seal. A portion of the fluid in the space 62 will leak past the labyrinth shaft seal and increase the pressure in the interior of the bearing carrier 14 until it substantially equals the pressure existing in the space 62. The pressure in the space 62 is vented as explained above through the flow control orifice plug 64 in the vent passageway 63. The opening in the plug 64 can be selected to permit adequate flow of cooling air for any particular design. The pressure of the fluid admitted to the right-hand end of the cooling passages is controlled by the pressure regulating means 71 so that the suction pressure of the compressor always exceeds it by a predetermined amount. Thus, the pressure differential, when the machine is operating, existing across the compressor shaft seal 34, 38 will be considerably reduced, resulting in a reduction in the leakage of refrigerant past the compressor shaft seal. Even though the pressure differential is reduced, the pressure in the interior of the bearing carrier is maintained below the suction pressure of the compressor by the pressure regulating means 71 to insure that any leakage will be of refrigerant into the bearing carrier and not air into the refrigeration system.

While but one embodiment of this invention has been shown and described in detail, many modifications will occur to those skilled in the art within the broad spirit and scope of its teachings.

I claim:

1. A refrigeration compressor unit adapted to handle a vapor cycle refrigerant having a normal suction pressure above normal sea level atmospheric pressure, comprising: a compressor unit and driving unit mounted in a common casing; the rotating elements of said compressor and driving units being mounted on a common shaft; bearing means mounted in said common casing for rotatably supporting said common shaft; first shaft sealing means mounted in said common casing between said bearing means and said driving unit; second shaft sealing means mounted in said casing between said bearing means and said compressor unit; a passageway formed in said casing adjacent said bearing means; inlet means connected to one end of said passageway adjacent said compressor for conducting fluid under pressure to said passageway, said second shaft sealing means being subjected on one side to the pressure of the fluid in said passageway, the other end of said passageway terminating in an opening adjacent said first sealing means; an outlet opening formed in said casing and having restricted orifice means mounted therein for venting fluid from said passageway to a zone of lower pressure; and control means mounted in said inlet means, said control means being adapted to maintain the pressure of the fluid in said passageway a predetermined amount below the suction pressure of said compressor.

2. A pneumatic turbine-driven refrigeration compressor adapted to handle vapor cycle refrigerants having a normal suction pressure exceeding normal sea level atmospheric pressure, comprising: a common compressor and turbine casing; a bearing means for rotatably supporting a shaft in said casing; a compressor impeller and a turbine wheel mounted on said shaft; a compressor shaft seal means mounted in said casing adjacent said impeller; a turbine shaft seal means mounted in said casing adjacent said turbine wheel; at least one longitudinal passageway formed in said common casing adjacent said bearing means; an inlet passageway connected at one end to the pneumatic power supply of said turbine and adapted to conduct a supply of pressurized fluid to the end of said longitudinal passageway adjacent said compressor shaft seal means, said compressor shaft seal means being subjected on one side to the pressure of the fluid in said longitudinal passageway; the other end of said longitudinal passageway terminating in an annular chamber formed in said casing so as to surround said turbine shaft seal means; an outlet passageway having restricted orifice means for venting said annular chamber to the atmosphere; and control means mounted in said inlet passageway, said control means including a regulator responsive to the suction pressure of said compressor and adapted to control the flow of pressurized fluid through said inlet passageway so as to maintain the pressure of the fluid in said longitudinal passageway a predetermined amount below the suction pressure of said compressor.

3. A pneumatic turbine-driven refrigeration compressor adapted to handle vapor cycle refrigerants having a normal suction pressure exceeding normal sea level atmospheric pressure, comprising: a common compressor and turbine casing; a means for rotatably supporting a shaft in said casing; a compressor impeller and a turbine wheel mounted on said shaft; a compressor shaft seal having a ring member mounted in said casing and disposed to engage in a sealing relationship a surface of said compressor impeller; a labyrinth type turbine shaft seal means mounted in said casing adjacent said turbine wheel; at least one longitudinal passageway formed in said common casing adjacent the shaft supporting means; an inlet passageway connected at one end to the pneumatic power supply of said turbine and adapted to conduct a supply of pressurized fluid to the end of said longitudinal passageway adjacent said compressor shaft seal means, said compressor shaft seal means being subjected on one side to the pressure of the fluid in said longitudinal passageway; the other end of said longitudinal passageway terminating in an annular space surrounding said turbine shaft seal means; an outlet passageway having restricted orifice means for venting said annular space to the atmosphere; and control means mounted in said inlet passageway, said control means including a regulator responsive to the suction pressure of said compressor and adapted to control the flow of pressurized fluid through said inlet passageway so as to maintain the pressure of the fluid in said longitudinal passageway a predetermined amount below the suction pressure of said compressor.

4. A turbine-driven compressor, comprising: a casing having a turbine section, a compressor section and an intermediate chamber; bearing means rotatably supporting a shaft in said casing; a compressor impeller and a turbine wheel mounted on said shaft; compressor shaft seal means and turbine shaft seal means mounted in said casing and surrounding said shaft; inlet means for connecting a source of pressurized fluid to the portion of said casing surrounding said shaft between the compressor shaft seal means and the turbine shaft seal means; outlet means having a restricted orifice for venting fluid from said portion of said casing between said shaft seal means to a zone of lower pressure; and control means mounted in said inlet means, said control means including a regulator responsive to the suction pressure of said compressor and adapted to maintain a predetermined differential between the pressures existing on the opposite sides of said compressor shaft seal means.

References Cited in the file of this patent

UNITED STATES PATENTS

| | | | |
|---|---|---|---|
| 1,241,372 | Guyer | Sept. 25, | 1917 |
| 1,260,100 | Udell | Mar. 19, | 1918 |
| 2,577,134 | Land | Dec. 4, | 1951 |
| 2,641,442 | Buchi | June 9, | 1953 |
| 2,709,567 | Wood | May 31, | 1955 |
| 2,775,400 | Cox | Dec. 25, | 1956 |